(12) United States Patent
Duke

(10) Patent No.: US 11,023,498 B1
(45) Date of Patent: Jun. 1, 2021

(54) DYNAMIC OBJECT RELATIONSHIP GENERATOR

(71) Applicant: Wells Fargo Bank, N.A., San Francisco, CA (US)

(72) Inventor: Michael Thomas Duke, Monroe, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 383 days.

(21) Appl. No.: 14/992,578

(22) Filed: Jan. 11, 2016

Related U.S. Application Data

(60) Provisional application No. 62/108,266, filed on Jan. 27, 2015.

(51) Int. Cl.
*G06F 16/28* (2019.01)
*G06F 16/58* (2019.01)
*G06F 16/951* (2019.01)
*G06F 40/253* (2020.01)

(52) U.S. Cl.
CPC ............ *G06F 16/288* (2019.01); *G06F 16/58* (2019.01); *G06F 16/951* (2019.01); *G06F 40/253* (2020.01)

(58) Field of Classification Search
CPC ............ G06F 17/30604; G06F 17/274; G06F 17/30265; G06F 17/30864; G06F 16/288; G06F 16/58; G06F 16/951; G06F 40/253
See application file for complete search history.

(56) References Cited

U.S. PATENT DOCUMENTS

| | | |
|---|---|---|
| 6,073,115 A | 6/2000 | Marshall |
| 7,571,177 B2 | 8/2009 | Damle |
| 8,024,246 B2* | 9/2011 | Aiderman .......... G06Q 30/0641 705/27.1 |
| 8,161,325 B2 | 4/2012 | Calman et al. |
| 8,275,796 B2 | 9/2012 | Spivack et al. |
| 8,290,951 B1 | 10/2012 | Joa et al. |
| 8,315,998 B1 | 11/2012 | Dean |
| 8,396,824 B2 | 3/2013 | Au |
| 8,407,253 B2 | 3/2013 | Ryu et al. |
| 8,738,434 B1* | 5/2014 | Rodriguez ......... G06Q 30/0282 705/14.13 |
| 8,751,487 B2 | 6/2014 | Byrne et al. |
| 8,782,039 B2 | 7/2014 | Byrne et al. |
| 9,665,662 B1 | 5/2017 | Gautam et al. |

(Continued)

FOREIGN PATENT DOCUMENTS

WO 2013127951 A1 9/2013

*Primary Examiner* — Alford W Kindred
*Assistant Examiner* — Lin Lin M Htay
(74) *Attorney, Agent, or Firm* — Merchant & Gould P.C.

(57) ABSTRACT

An electronic computing device includes a processing unit and system memory. The system memory includes instructions which, when executed by the processing unit, cause the electronic computing device to receive data associated with one or more customers of an institution. The data is received from one or more other electronic computing devices. The received data is analyzed to identify objects in the data. Relationships are derived between the objects in the data. One or more images depicting the objects are obtained from the Internet. Information regarding the objects is sent to a display device. The information includes the images depicting the objects and the relationships between the objects.

18 Claims, 9 Drawing Sheets

(56) References Cited

U.S. PATENT DOCUMENTS

| | | | |
|---|---|---|---|
| 2002/0082825 A1* | 6/2002 | Rowlandson | G06F 16/353 |
| | | | 704/9 |
| 2003/0149656 A1* | 8/2003 | Magruder | G06Q 20/105 |
| | | | 705/38 |
| 2006/0047636 A1 | 3/2006 | Mohania et al. | |
| 2007/0041370 A1 | 2/2007 | Cleveland | |
| 2008/0001948 A1* | 1/2008 | Hirsch | G06T 11/20 |
| | | | 345/440 |
| 2010/0076882 A1* | 3/2010 | Butler | G06Q 40/00 |
| | | | 705/35 |
| 2010/0185509 A1* | 7/2010 | Higgins | G06Q 30/02 |
| | | | 705/14.49 |
| 2012/0158633 A1 | 6/2012 | Eder | |
| 2013/0041720 A1 | 2/2013 | Spires | |
| 2013/0066676 A1 | 3/2013 | Williams et al. | |
| 2013/0073386 A1 | 3/2013 | Rose et al. | |
| 2013/0080461 A1 | 3/2013 | Byrne et al. | |
| 2013/0124574 A1* | 5/2013 | Brettin | G06F 17/30958 |
| | | | 707/798 |
| 2014/0039877 A1* | 2/2014 | Guenigault | G06F 17/21 |
| | | | 704/9 |
| 2014/0067369 A1 | 3/2014 | Stavrianou et al. | |
| 2014/0164502 A1 | 6/2014 | Khodorenko et al. | |
| 2015/0100907 A1 | 4/2015 | Erenrich et al. | |
| 2015/0227579 A1 | 8/2015 | Cantarero et al. | |
| 2017/0186023 A1* | 6/2017 | Ma | G06Q 30/0202 |

* cited by examiner

DYNAMIC OBJECT RELATIONSHIP GENERATOR

BACKGROUND

Institutions can have different ways of communicating with customers and, the information that is received during these communications can take different forms. Example customer interactions can include in-person and online transactions, communications with institution personnel at physical locations, telephone logs when a customer telephones the institution, online interactions, etc.

These communications can include information that can provide a personal profile of the customer. The personal profile can help the institution provide better service to the customer, such as by offering products that are tailored to the customer. However, because the communications can come from different sources, at different times and because the information can be stored on different computer systems, the information may not be processed in a way that can be helpful to institution personnel.

SUMMARY

Embodiments of the disclosure are directed to an electronic computing device. The electronic computing device comprises a processing unit; and system memory, the system memory including instructions which, when executed by the processing unit, cause the electronic computing device to: receive data associated with one or more customers of an institution, the data being received from one or more other electronic computing devices; analyze the received data to identify objects in the data; derive relationships between the objects in the data; obtain from the Internet one or more images depicting the objects; and send information to a display device regarding the objects, the information including the images depicting the objects and the relationships between the objects.

In another aspect, an electronic computing device comprises: a processing unit; and system memory, the system memory including instructions which, when executed by the processing unit, cause the electronic computing device to: receive data associated with one or more customers of an institution, the data being received from one or more other electronic computing devices; process the data to classify information within the data; determine relationships between the classified information within the data; and display a visual representation based on at least one of the relationships within the data.

In yet another aspect, a computer-readable data storage memory comprising instructions that, when executed by a processing unit of an electronic computing device, cause the processing unit to: receive data regarding customer interactions with a financial institution from one or more other electronic computing devices, the data including one of more of electronic documents, emails, telephone logs and banker's notes; analyze grammatical elements in the received data to identify objects in the data, the grammatical elements including one or more of nouns, adjectives and verbs; derive relationships between the objects in the data by associating one or more of the nouns, adjectives and verbs with one or more of the objects in the data; obtain from the Internet one or more images depicting the objects; send information to a display device regarding the objects, the information including the images depicting the objects and the relationships between the objects; and provide a link to financial institution personnel for the images depicting the objects and the relationships between the objects.

The details of one or more techniques are set forth in the accompanying drawings and the description below. Other features, objects, and advantages of these techniques will be apparent from the description, drawings, and claims.

DETAILED DESCRIPTION

Figure 1:
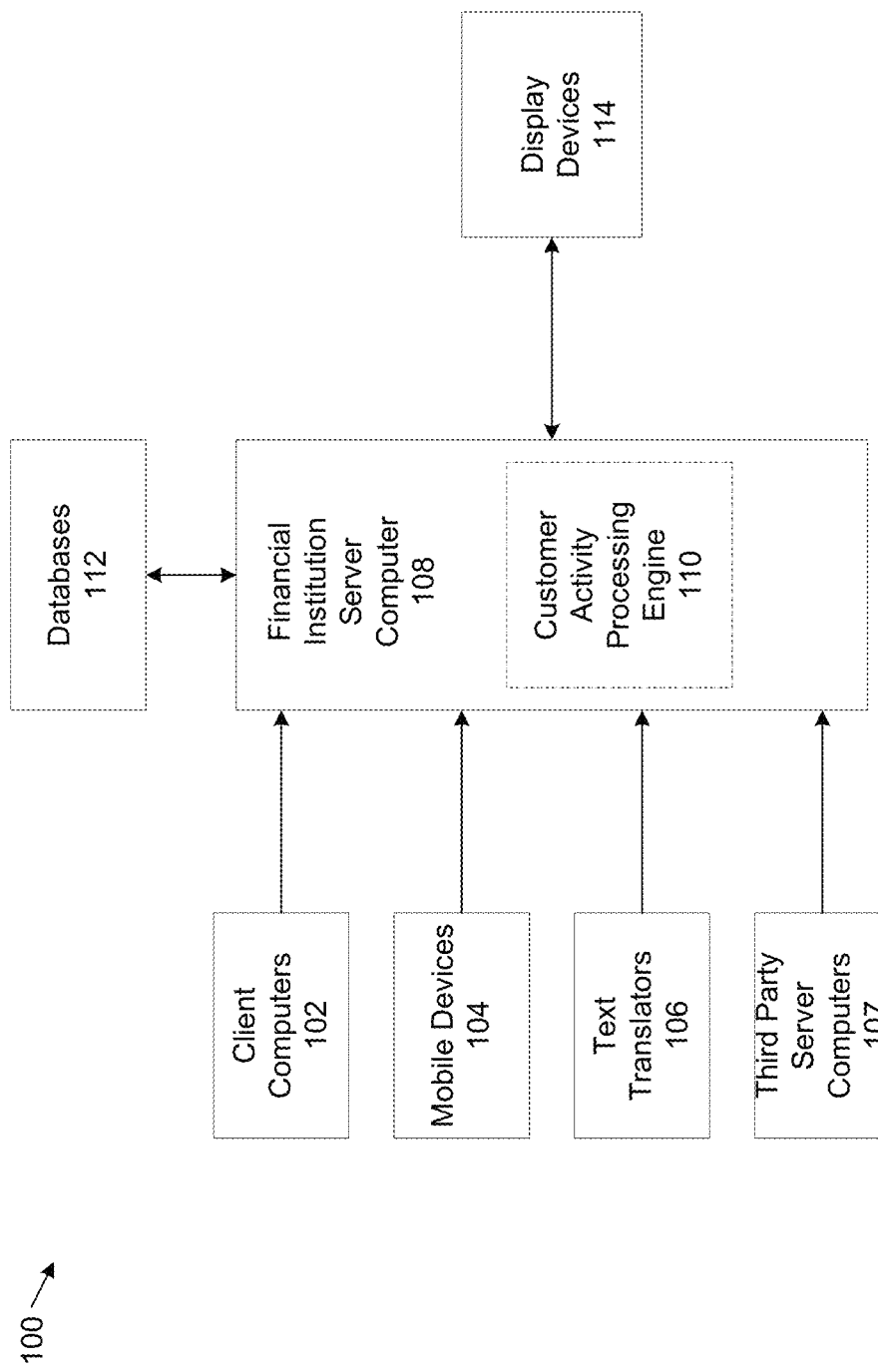
FIG. 1 shows an example system that supports a dynamic object relationship generator.

The present disclosure is directed to systems and methods for processing communications and other information from customers of institutions to provide a comprehensive profile of the customer. The customer profile can be used to help the institutions predict customer behavior as a way to proactively provide services to the customer. The systems and methods are also directed to automatically discover and display images from the customer information to provide a pictorial view of different customer scenarios.

The systems and methods can apply to a wide range of institutions. Example institutions to which the systems and methods can apply include financial institutions, retail companies, insurance companies, online businesses, utility companies, health care organizations, etc. Other types of institutions are possible. In general, the systems and methods can apply to any institution in which a customer interacts with the institution and in which a profile of the customer is kept at the institution.

In this disclosure, the systems and methods are described for a financial institution. However, the systems and methods can also apply to any of the other institutions mentioned above.

Customers can interact with financial institutions in a plurality of ways. For example, customers can deposit and withdraw money from financial institution accounts. Customers can make payments via writing checks, via electronic bill pay, via electronic fund transfers and other means. Customers can interact with personnel of financial institutions by meeting in-person, talking on the telephone or chatting online. Customers can apply for mortgages and other loans and can access a financial institution website to learn about a financial institution's products and to view account information. Other ways in which customers interact with financial institutions are possible.

Each time a customer interacts with a financial institution, a record of the interaction is usually stored by the financial institution. The record can take the form of a transaction record, a telephone log, a customer email, an employee's notes, a chat log, a text message, social media, etc. Other types of records are possible. The records can be stored on different computer systems that can be located in different geographical areas.

Often the records of customer communications are not effectively assimilated by the financial institution's information systems. As a result, content, meaning and implications of the customer's communications are often not sufficiently understood and structured for an automated process to exploit and leverage. In addition, customer relations can be negatively impacted when customers are asked by the financial institution to repeat information previously communicated to the financial institution. Furthermore, the financial institution may miss out on opportunities to provide additional services to the customer that can result in added revenue to the financial institution and that can help improve customer relationships with the financial institution.

Using the systems and methods, one or more records of customer interactions with the financial institution can be processed to extract objects from the one or more records. An object can be an entity obtained from the customer interaction. Some examples of objects can include customers, employees of the financial institution, family members of customers, physical objects such as cars, houses, consumer items, loans, mortgages, vacations, in general any entity that can grammatically be expressed as a noun.

Relationships can be determined from the customer interactions and the objects and information can be classified. For example, a determination can be made that a customer has contacted a personal banker and has applied for a car loan. As another example, a determination can be made that a financial institution customer who has viewed information on a financial institution web site regarding student loans and who is known to have a daughter of college age may be interested in obtaining a loan for college.

In one embodiment using the systems and methods, images can be automatically obtained for one or more objects and used to create a visual representation of a customer relationship. As discussed in more detail later herein, an image of an object can be obtained from the Internet via means of a web search, sometimes known as a cloud crawl. Also, as discussed in more detail later herein, the visual representation can be provided on a three-dimensional display device so that a viewer of the visual representation, for example a financial institution employee, can be immersed in the visual representation.

In another embodiment using the systems and methods, records of customer interactions can be parsed by a natural language processor. Grammatical terms such as subject, predicate and object can be extracted from the records. A machine language processor can identify relationships from the grammatical terms and insights can be gained on the customer interactions by observing customer behavior over time. The insights can be used to provide proactive customer service, such as suggesting financial institution products that may be useful for the customer. The insights can also be used to improve customer retention, reduce fraud risk and enhance marketing efforts.

The systems and methods can be also used for environments other than finance. In general, the systems and methods can be used to capture unstructured content, convert the unstructured content into a structured content and automatically discover and display images corresponding to the structured content.

FIG. 1 shows an example system 100 that can be used to support the systems and methods discussed in this disclosure. The example system 100 includes client computers 102, mobile devices 104, text translators 106, third party server computers 107, a financial institution server computer 108, databases 112 and display devices 114. The financial institution server computer 108, in this example a server computer at a financial institution, also includes a customer activity processing engine 110.

The example client computers 102 can include desktop computers or laptop computers that a customer can use to access the financial institution server computer 108. One or more client computers 102 can be used and the client computers 102 can be at different geographical locations. Access to the financial institution server computer 108 is via an Internet connection.

The example mobile devices 104 can include smartphones, tablet computers or any similar wireless device. One or more mobile devices 104 can be used. Access to the financial institution server computer 108 is via a wireless Internet connection.

The example text translators 106 can include scanners that convert hand-written notes, for example banker's notes relating to customers, into electronic text. The text translators 106 can also include converters that can convert voice recordings such as telephone logs into electronic text.

The example third party server computers 107 are server computers from third parties such as social media and text messaging. Information can be sent from the third party server computers expressing opinions regarding the financial institution, customer interactions with the financial institution and other opinions and data. The information and data sent from the third party server computers 107 to the financial institution server computer 108 can supplement information received from the other sources mentioned.

The example financial institution server computer 108 is a server computer at a financial institution. The financial institution server computer 108 can process customer and financial institution communications from client computers 102, from mobile devices 104, from text translators 106 and from third party server computers 107. The financial institution server computer 108 also can process and store information such as customer transaction history and other types of information.

The financial institution server computer 108 includes the customer activity processing engine 110. As explained in more detail later herein, the customer activity processing engine 110 processes customer information from a plurality of sources and derives objects and functions from the customer information. The customer activity processing engine 110 can automatically discover and display images corresponding to the identified objects and functions. Images can be displayed on both two and three dimensional display devices. The customer activity processing engine 110 can also use the identified objects and functions to infer relationships and predict future customer behavior.

The financial institution server computer 108 as represented in FIG. 1 can be one server computer or a plurality of server computers, some or all the of the plurality of server computers being at different geographical locations. The example system 100 can be both a federated and distributed system whereby local server computers can process customer information and transmit the customer information to one or more central locations. As discussed in more detail later herein, links to the customer information can be provided to financial institution employees at different geographical locations.

Databases 112 include one or more databases that store data about the customer. The data may include a customer profile, a customer transaction history, telephone logs and other similar information.

Display devices 114 include one or more display devices for displaying customer relationship data. The display devices may include both two-dimensional display devices and three-dimensional display devices. In example implementations to be explained in more detail later herein, the customer relationship data can be displayed using a graph database, using a three-dimensional display such as Google Goggles or Oculus Rift, or in other ways.

The systems and methods of the present disclosure can be also applied to scenarios other than for financial institutions. In a generic case, the financial institution server computer 108 can be referred to as a server computer 108 and the customer activity processing engine 110 can be referred to as a data processing engine 110.

Figure 2:
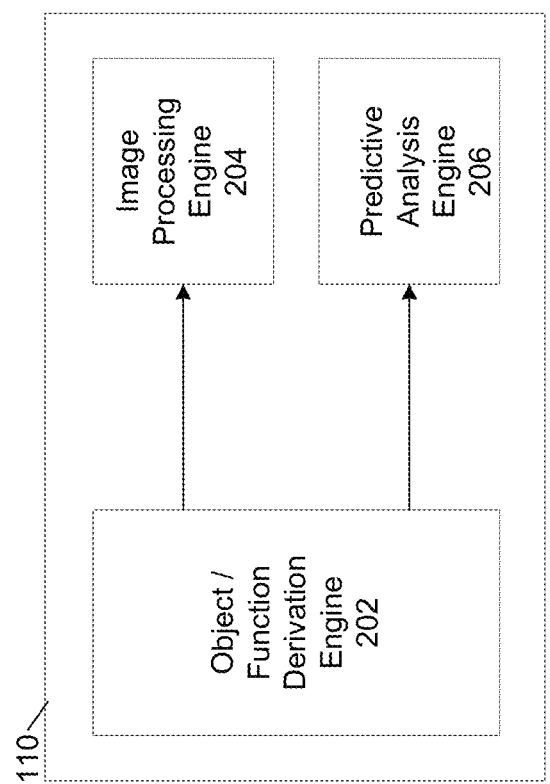
FIG. 2 shows example modules of the customer activity processing engine of FIG. 1.

FIG. 2 shows example modules of customer activity processing engine 110 of FIG. 1. The customer activity processing engine 110 includes an object/function derivation engine 202, an image processing engine 204 and a predictive analysis engine 206.

The example object/function derivation engine 202 derives objects and functions from the customer data input. The object/function derivation engine 202 can operate on a character separated format file, for example a text file, a Microsoft Word document, a spreadsheet, an e-mail, a series of emails and other similar types of documents. Objects, for example nouns, can be identified from the customer data input and the objects can be combined into functions.

The example image processing engine 204 can automatically discover images corresponding to the objects and the functions. The images can be discovered by means of an Internet cloud crawl, as discussed in more detail later herein. The images can be displayed on a two-dimensional or three-dimensional display device. The image processing engine 204 includes an application programming interface (API) that permits the use of third party display devices.

The example predictive analysis engine 206 uses the objects and functions in the customer information to update a profile for a customer, to make inferences about the customer and to predict future behavior of the customer. The predictive analysis engine 206 is explained in more detail later herein.

Figure 3:
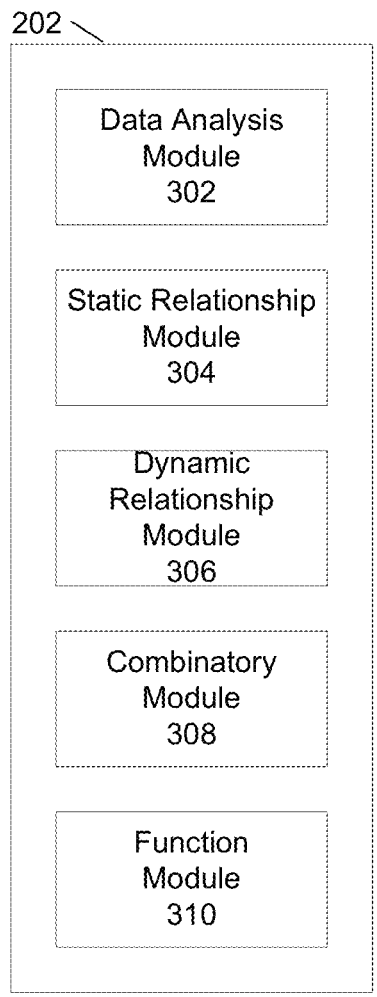
FIG. 3 shows example modules of the object/function derivation engine of FIG. 2.

FIG. 3 shows example modules of object/function derivation engine 202. The object/function derivation engine 202 includes a data analysis module 302, a static relationship module 304, a dynamic relationship module 306, a combinatory module 308 and a function module 310.

The example data analysis module 302 receives textual data and parses the textual data to extract grammatical elements of the textual data, specifically nouns, verbs and prepositional phrases. In one implementation, the textual data is data that is derived from interactions between customers and a financial institution computing system, from interactions between financial institution personnel and the financial institution computing system and from interactions between customers and financial institution personnel. The textual data may be in the form of a comma separated value (CSV) file, a text file, a text document such as a Microsoft Word file, a spreadsheet, etc. In this implementation, the financial institution computing system can be a server or other computer associated with a financial institution, for example financial institution server computer 108.

The data analysis module 302 can make use of a natural language processor to parse and classify the textual data. The natural language processor can produce a grammatical structure for the textual data including subject, predicate and object. The subjects and objects can be nouns and the predicates can be verbs. In addition, other grammatical structural elements such as prepositional phrases and conjunctions can be identified. The grammatical structure can be stored in memory. In some implementations, a graph database can be used to store the grammatical structure of the parsed textual data.

As an example of use of the data analysis module 302, an analysis of customer data can determine that a man named James Jackson is planning to purchase a sports utility vehicle (SUV) for his family. When the customer data is analyzed, James Jackson can be determined to be a subject, sports utility vehicle can be determined to be an object and "intends to purchase" can be a predicate. In addition, the data analysis module 302 can determine that James Jackson can be classified as a person and that sports utility vehicle is an automobile, which in turn can be classified as a motor vehicle, which in turn can be classified as an asset.

The example static relationship module 304 receives the grammatical structure of the parsed textual data and determines relationships between elements of the grammatical structure based on rules within the static relationship module 304. For example, if nouns such as dog and Mike may appear several times in the grammatical structure, the static relationship module 304 can determine that Mike is associated with dogs in some way. If the grammatical structure contains adjectives such as short, large, red and brown, the static relationship module 304 can determine that there may be short dogs, large dogs, red dogs, brown dogs or some combination of short, large, red and brown dogs.

The more elements in the grammatical structure, the more the static relationship module 304 may be able to refine relationships between the elements. For example the static relationship module 304 can determine that Mike owns two dogs—a short red dog and a large brown dog. Other aspects of the relationship between Mike and the dogs may be determined, for example that Mike likes to feed the dogs a particular brand of dog food or that Mike has an appointment to take the large brown dog to a veterinarian.

As another example, where the grammatical structure contains several occurrences of the name Lisa, the static relationship module 304 can determine that Lisa is a woman; Lisa is a student; Lisa is applying for admission to a college; Lisa has parents named Tom and Mary; Tom, Mary and Lisa have accounts at the financial institution, etc. Additional information known to the financial institution about Tom, Mary and Lisa can help the customer activity processing engine 110 predict future behaviors of one or more of Tom, Mary and Lisa, as explained in more detail later herein.

The example dynamic relationship module 306 permits relationships determined by the static relationship module 304 based on rules to be refined based on human interaction. For example, whereas the static relationship module may have determined that Mike owns a short red dog and a large brown dog, Mike may actually own a short brown dog and a large red dog. The dynamic relationship module 306 permits a user, for example a customer or a financial institution employee to modify the static relationships regarding Mike's dogs. In this sense, objects identified by the data analysis module 302 are dynamic objects because relationships regarding the objects can be dynamically modified.

The dynamic relationship module 306 permits static and dynamic relationships from multiple data sources to be combined to create a functional set or model. For example, the information regarding Mike's dogs may have come from a text document. The data analysis module 302 can process a plurality of documents including email messages, comma separated value (CSV) file, other text documents, etc. Some of the plurality of documents can contain different type of information about dogs. For, example one document may include information about stray dogs in Manhattan. Another document may contain information about dog veterinarians in Manhattan. New or different information can be obtained from the plurality of documents.

The example combinatory module 308 can combine object definitions regarding static and dynamic relationships obtained from the plurality of documents to a more accurate functional model. The combinatory module 308 can determine combinatory relationships between the plurality of documents and extrapolate relationships based on noun correlation, adjective plus noun correlation and adjective plus noun plus verb correlation.

The example function module 310 analyzes verbs in the plurality of documents to attempt to determine behavioral aspects of the grammatical elements in the plurality of documents and to provide a functional modeling for the grammatical elements. For example, the function module 310 may be able to determine that the short red dog is running and that the large brown dog is being petted by a boy.

Figure 4:
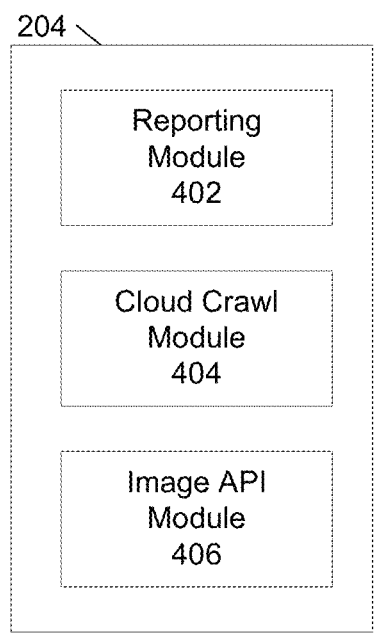
FIG. 4 shows example modules of the image processing engine of FIG. 2.

FIG. 4 shows example modules of the image processing engine 204. The example image processing engine includes a reporting module 402, a cloud crawl module 404 and an image application programming interface (API) module.

The example reporting module 402 can provide a visual report regarding the obtained objects and relationships. For example, instead of just providing a written report regarding stray dogs in Manhattan, the reporting module 402 can display an incidence of stray dogs on a map of Manhattan. Reporting in this example is geographic contextual data visualization.

The example cloud crawl module 404 searches the Internet for an image corresponding to an object or function output from the object/function derivation engine 202. Using the cloud crawl module 404, an image can be automatically discovered and obtained that matches a derived object, such as a noun, or a noun modified by an adjective, or a noun modified by an adjective in conjunction with a verb. For example, when the derived object is a dog, the cloud crawl module 404 can search the Internet and return an image of a dog. When the derived object is a red dog, the cloud crawl module 404 can search the Internet and return an image of a red dog. When the derived object is a red dog running, the cloud crawl module 404 can search the Internet and return an image of a red dog running.

In addition or in lieu of searching the Internet, the cloud crawl module 404 can search a graphics library of a manufacturer of a display device. In some implementations, a preferred approach is to search the graphics library of the manufacturer of the display device first. If the desired image is not located during the search of the graphics library, images obtained from the Internet search can be used. The result of such searches is to obtain an image corresponding to a structured textual input for the search. For example, when the customer activity processing engine 110 receives an email message and the object/function derivation engine 202 derives structured elements from the email message, the cloud crawl module 404 can obtain one or more images based on the structured elements from the email message. The result is to take a structured input and turn the structured input into a visual representation of the structured input.

The example image API module 406 provides an application programming interface to the display devices 114. The display devices can display the images obtained from the cloud crawl module 404. As discussed earlier herein, the display devices 114 can include a two-dimensional display device and a 3-dimensional display device. Each type of the display devices 114 makes use of API commands from the image API module 406 to obtain and display the obtained images.

The image API module 406 provides support for a plurality of API commands. Some example API commands supported by the image API module 406 include Fetch-DerivedObjects, FetchDerivedAttributes and FetchDerivedRelationships. Other API commands are possible. The image API module 406 can make function calls to the Object/Function Derivation Engine 202 and the cloud crawl module 404 to obtain results from the example API commands and any other API commands.

The example FetchDerivedObjects command returns objects derived by object/function derivation engine 202. An example syntax for this command is FetchDerivedObjects (Noun Array). The derived objects are returned in form of a noun array, each object being noun.

The example FetchDerivedAttributes command returns attributes associated with objects obtained by the FetchDerivedObjects command. An example syntax for this command is FetchDerivedAttributes(Noun Array, Preposition Array). In this example, the Noun Array is the Noun Array returned from the FetchDerivedObjects command. The attributes returned as a result of the FetchDerivedAttributes command are returned in the Preposition Array.

The example FetchDerivedRelationships command returns relationships derived by the object/function derivation engine 202. An example syntax for this command is FetchDerivedRelationships(UnderstoodRelationshipTableid, UnresolvedNounIndex).

The images obtained from the cloud crawl module 404 can be displayed on one or more of display devices 114. The display devices 114 obtain object, attribute and relationship information needed to obtain and display the images from the API commands available from the image API module 406.

When the display device 114 is a two-dimensional display device, images relating to objects, relationships and attributes are displayed using a standard two-dimensional display device. In one implementation involving a two-dimensional display, objects and relationships between objects can be represented as modes and edges in a linked graph. Other implementations involving a two-dimensional display are possible.

Figure 5:
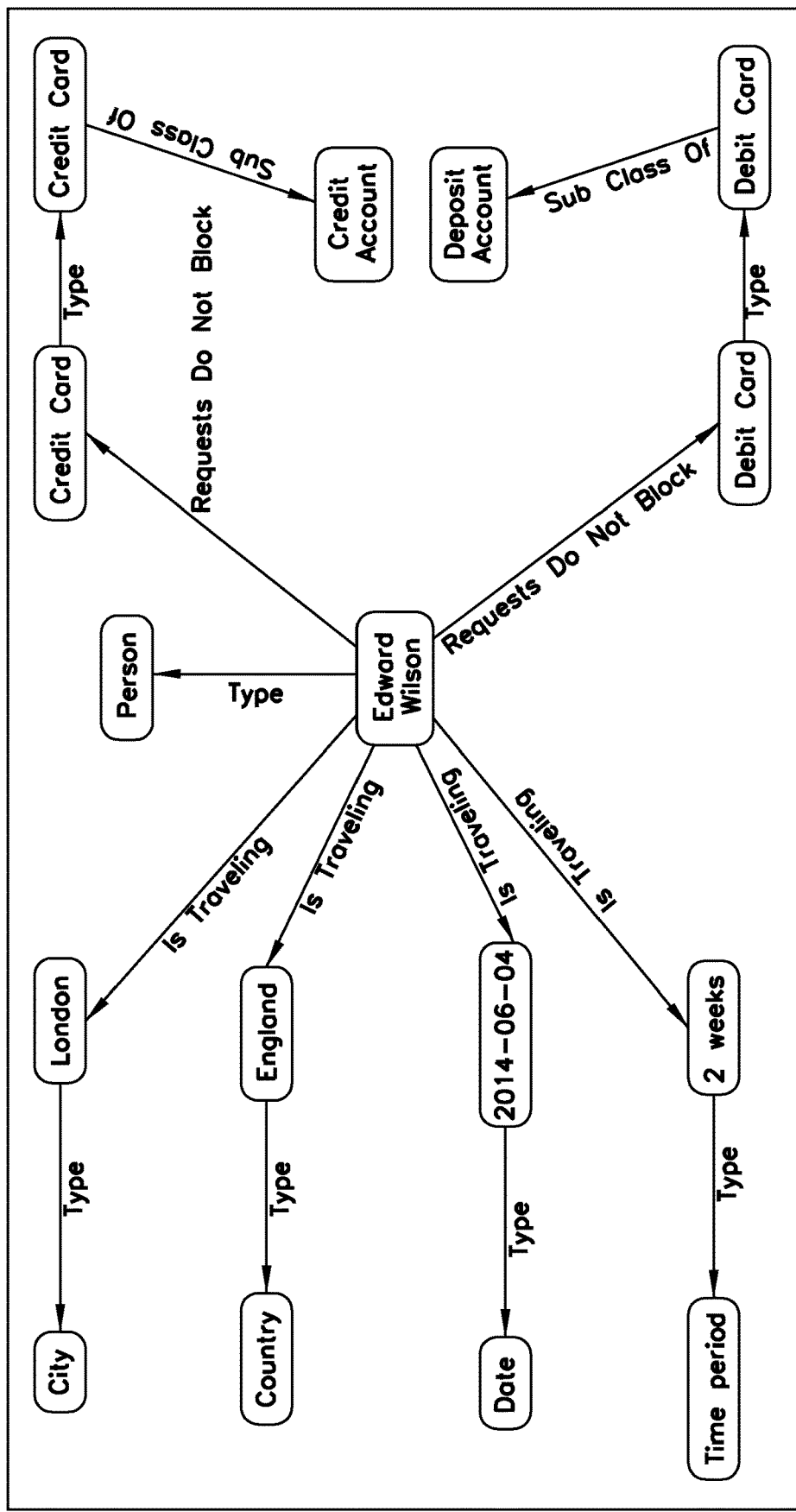
FIG. 5 shows an example two-dimensional display graph.

FIG. 5 shows an example two-dimensional display graph 500. The example two-dimensional display graph 500 is a visualization of customer data for a particular customer, Edward Wilson. The customer data indicates that Edward Wilson will be traveling to London England for two weeks starting on Jun. 6, 2014 and that Edward Wilson has requested that transactions on his credit card and debit card should not be blocked. When the display graph 500 is linked to Edward Wilson's name or to a customer identifier for Edward Wilson on the financial institution server computer 108, a financial institution employee working in Edward Wilson's account or in communication with Edward Wilson can immediately see that Edward Wilson is traveling and does not want transactions on his credit or debit cards to be blocked.

When the display device 114 is a three-dimensional display device, the objects and relationships can be viewed in a three-dimensional space, for example via the use of a headset. With certain three-dimensional devices, for example Oculus Rift, a user can not only view the objects and relationships but can also use actions such as touching, moving and viewing objects to interact with the three-dimensional display and modify one or more of the objects and relationships. For example, interaction (simulated touch) with a virtual object can cause a drill down of the virtual object or relationship attributes. Interaction with the virtual object can also change the size, shape or other feature of the virtual object. Interaction with the virtual object can also cause the virtual object to be moved. In addition, viewing a virtual object can cause information regarding the virtual object to be displayed on the three-dimensional display.

The example predictive analysis engine 206 can use objects, relationships and attributes obtained from the object/function derivation engine 202 to update a profile for a customer, to make inferences about the customer and to predict future behavior of the customer. In one implementation, the predictive analysis engine 206 can include or have access to a semantic graph database which can be structured along basic grammar including subject, predicate and object. In this way, the semantic graph database can classify the derived objects, relationships and attributes, etc. In addition, the predictive analysis engine 206 can apply machine intelligence that can further capture relationships and insights regarding objects, relationships and attributes. Insights can be gained from multiple interactions with the customer, observing behaviors of the customer and analyzing patterns of behaviors in other customers. In addition, customers can be grouped along certain parameters in order to obtain aggregate or macro-level insights regarding the customer. Customers can be stratified into groups in order to improve marketing outreach to the customers.

As an example of the use of the predictive analysis engine 206, starting with objects and relationships such as Lisa is planning on attending Stanford University, the predictive analysis engine 206 can obtain or make use of available information to make inferences about about Lisa. For example, the predictive analysis engine 206 can determine that Stanford University is an academic institution, it is a top-tier academic institution and it is a high tuition based institution. Therefore, an inference can be made that Lisa is a very bright student. A determination can be made that either Lisa may have a large scholarship or that Lisa's family is funding her education. An inference can be made that Lisa belongs to a high value household. This inference can create a lead for a relationship at the financial institution with Lisa and Lisa's family.

Information regarding Lisa can then be provided visually to a representative at the financial institution so that the representative can better determine a future course of action. For example, Lisa and Stanford University can each be represented as a node, for example a circle, on a two-dimensional display device. A line can be drawn between each circle, indicating that Lisa is attending Stanford. Lisa can also be linked to a picture of her father. The display can also show that Stanford is a top-tier high priced academic institution and that Lisa's household may be a potentially high value household. The display may also show recommendations relating to this scenario.

In another example of the use of the predictive analysis engine 206, obtained customer data may indicate that the customer has had a bad experience at the financial institution. For example, the customer may have called an employee at the financial institution and complained about something. The conversation between the employee and customer may have been memorialized in a note from the employee regarding the conversation. Or the customer may have made a comment on a social media website describing a bad experience at the financial institution. When data from the employee's note and the social media website are analyzed, for example by data analysis module 302, objects and relationships can be derived regarding the bad experience at the financial institution. The objects and relationships can be visualized on one of the display devices 114. In addition, the predictive analysis engine 206 can make an inference that the customer is not happy about his experience at the financial institution and may want to transfer his accounts to another financial institution. A determination can be made that a proactive call to the customer from a representative at the financial institution is warranted to discuss the customer's concerns.

In other examples, when customer data indicates a customer is expecting a baby, the predictive analysis engine 206 can suggest automatically recommending a saving account for the new baby and sending a congratulatory note. When customer data indicates that a customer is having stress because her husband is ill and she is having difficulty paying her mortgage, the predictive analysis engine 206 can suggest offering financial help, offering a free credit score and recommending sensitivity during communications with the customer.

In more detail, the systems and methods described in this disclosure comprise: 1) capturing and semantically processing customer communications with linked data and reasoning; 2) updating ontologies and statistical models using supervised and unsupervised learning methods; and 3) applying logic and statistical models to customer knowledge graphs to generate recommendations.

By capturing and semantically processing customer communications, updating the ontologies and statistical methods and applying logic and statistical models to customer knowledge graphs, the financial institution server computer 108 functions more efficiently. This is possible because the customer activity processing engine 110 identifies specific customers having problems and for whom additional attention may be warranted. Recommendations are then sent to these specific customers. This saves on processing time within the financial server computer 108 associated with identifying customers in need of remediation. It also saves on bandwidth needed by the financial server computer 108 because recommendations are targeted only to specific customers.

Capturing and semantically processing customer communications with linked data and reasoning can comprise a) capturing unstructured customer communications; b) using natural language processing (NLP) to semantically recognize and parse communications into RDF triples; c) constructing new individual customer knowledge graphs (ICKGs); d) updating existing ICKGs with new triples; d) extending ICKGs by linking to related internal and/or external data; and e) applying rules based reasoning from customer knowledge graphs (CKGs) to expand the ICKGs with inferred classifications and relationships.

As used in this disclosure, a CKG comprises knowledge learned and discovered about customers based on an understanding of customer communications, behaviors and context that can be expanded by using formal ontologies. The formal ontologies can represent generic knowledge about customers that is defined by business experts as well as by statistically enhanced ontologies that utilize machine learning. Also, as used in this disclosure, an ICKG comprises structured customer communications in a CKG that can be linked to related customer data from within a financial organization and also linked to external data obtained from the semantic web.

Unstructured customer communications can be captured using automated voice to text transcription tools and other recording where customer consent has been obtained. Other unstructured communication that can be captured can include notes following customer conversations with financial institution personnel, written comments captured from social media sites when authorized access to a customer's social media handles are provided, customer initiated emails, texts and chat conversations with the financial institution as well as text from comments entered by customers on specific online forms provided on web sites seeking comments, such as voice of the customer functions. Text records can be persisted as a set of files associated with a customer's unique enterprise identifier.

NLP capabilities can be used to semantically recognize and parse a textual representation of a customer communication into subject-predicate-object (s-p-o) statements, known as triples. Triples can be expressed using the World Wide Web Consortium's (W3C) Resource Description Framework (RDF) protocol. The W3C provides a Web Ontology Language (OWL) semantic web language. RDF/OWL ontologies can be used to associate a most likely terminology with parsed s-p-o communication in order to classify and type terms to a proper semantic meaning. Once a basic term is associated with an element defined in an ontology, the term automatically inherits classes or abstractions that have been predefined in the ontology, which can introduce an additional meaning and context for the term.

A conversion technique can be used to merge a rudimentary RDF vocabulary that may be provided in an NLP tool with a more expressive OWL vocabulary that may be needed to support semantic reasoning and inference. The OWL vocabulary can include an exact terminology appearing in a source RDF file or can have a mapping ontology that links the RDF vocabulary and OWL technology together. Using the conversion technique, an RDF file containing s-p-o statements from parsed customer communications is loaded into a semantic triple store and a named graph. A series of queries are invoked to convert data and namespaces of the source RDF triples into a namespace of a target OWL ontology. Data from the source RDF file is then converted into the target OWL ontology, thus automatically inheriting the richer semantic meaning and context expressed by the OWL file. When the data conversion is complete, the RDF named graph can be removed from the triple store, leaving newly converted data assertions that are typed directly to OWL concepts.

In order to create an ICKG for the first time, a new named graph needs to be created that can be identified with a customer. A set of triples can be constructed to reflect basic data relationships needed to describe the customer. The newly constructed triples can be loaded into the ICKG. For an existing ICKG, the existing ICKG can be located and the newly constructed triples can be loaded into the existing ICKG.

The contents of an ICKG can be expanded with internal information about the customer that is captured by different channels and systems supporting various lines of business within the financial institution. Relating customer data can be migrated from legacy data stores and loaded into a triple store containing the target ICKG. Semantic extraction, transformation and loading (ETL) tools such as R2RML (relational data base to RDF) or D2RQ can be used to provide relational-to-RDF mapping capabilities. Alternatively, legacy data can be directly accessed in-situ and dynamically merged with semantic data upon demand in memory for SPARQL queries using semantic data federation and integration tools.

It can be advantageous to expand the content of the ICKG with internal reference data that may be needed to obtain a more holistic view of the customer. This can provide a broader context of information pertaining to the customer and customer relationships. For example, if the customer is a business entity, it can be prudent to access and link information internally accessible about the financial state of the industry in which the customer may operate.

In some cases, date reference information is not available internally within an organization and thus external sources may need to be accessed and queried. The web is evolving into a semantic web such that machines can crawl the web in order to capture and understand content that is semantically tagged. For example, schema.org, a consortium led by Google, Yahoo, Microsoft and Yandex publishes light weight ontologies that provide semantic content for markup that helps machines understand web content. Alternatively, linked open data (LOD) sites publish rich ontologies, accessible as SPARQL endpoints, that provide increasing amounts of reference data and knowledge. As other examples, DBPedia is an LOD site that captures information published in Wikipedia and converts to RDF for semantic consumption and Google has announced an implementation of Wikipedia, based on Google's Knowledge Vault technology, which is a new knowledge graph facility replacing Freebase. In addition, other vendors are providing APIs to their own internally developed knowledge graph products in order to provide knowledge on demand.

Accessing external information can dramatically expand understanding and context of customer communications and certain customer events and transactions. The external information is knowledge that can be keys to unlocking hidden value of customer communications because connections can be made of what otherwise may be perceived as inanimate strings of information to actual things and events. For example, a customer statement that communicates the customer's daughter is attending Stanford University can be transformed to a statement that previously only a proactive and knowledgeable human agent can understand and who could take some desirable action regarding the customer to statement that a computing device can better understand and always take the desirable action. When specific external knowledge is retrievable and understandable to the computing device, the computing device can identify that undergraduate tuition at Stanford is 50% higher than mean tuition at U.S. universities and then link this acquired knowledge to the customer ICKG.

Rules based reasoning from a CKG can be applied to expand ICKGs with inferred classifications and relationships. A CKG is an ontology that describes the meaning of all concepts and rules that pertain to an organization's knowledge of a customer as a generic concept. Thus, a CKG is an operational ontology that acts as a knowledge repository for a customer. In contrast, an ICKG is a knowledge repository for a particular individual customer that contains specific facts and attributes about the customer. The CKG contains generalizations and rules that apply to all customers as well as to specifically named groups of customers. In semantic web terminology, a CKG is considered a Tbox ontology, because the CKG contains terminology and abstractions pertaining to a customer. The ICKG is considered an Abox ontology because the ICKG contains assertions for specific named individuals and relations that are instantiations of concepts defined in the CKG.

The CKG is an RDF/OWL ontology that is first formally constructed by domain level subject matter experts on customer classifications, behaviors, attributes, relationships and rules, etc. The CKG can be composed of upper level ontologies, global and industry standard ontologies, as well as enterprise ontologies and line of business ontologies that are updated by subject matter experts. The formally constructed ontologies are not by themselves sufficient to capture and represent all of the knowledge that can be semantically defined for a specific domain like customer. Ontologies can be enhanced by applying newly acquired probabilistically determined knowledge obtained by using machine learning techniques. These techniques can discover new customer related knowledge, relationships and insights. Each discovery can be associated with a conditional probability reflecting a degree of confidence in a knowledge assertion. New discoveries that exceed a specified threshold can be added to the CKG and can be applied to establish new customer related classifications based on a set of prior observations and facts associated with the customer.

When semantic reasoning is executed on an Abox ontology such as an ICKG, concepts and rules defined in a Tbox ontology such as a CKG can be referenced as a basis for reasoning. Semantic reasoning can iterate through data in the ICKG and use semantically defined axioms or rules to infer new classifications of data and new relationships appearing as new triples which are inserted into the ICKG.

For example, when a customer communicates that her daughter is attending Stanford, implications regarding the customer can be obtained, for example, that the customer has a high probability of being classified as a high value household. In addition, the predicate attending college can trigger a rule that directs a computing device to identify from external semantic web sources whether there is information available regarding average tuition at Stanford and how this compares to U.S. average tuition. A classifier rule can be calculated that determines whether a ratio of average tuition at Stanford divided by average U.S. tuition exceeds a threshold that can result in a lead opportunity for the financial institution for high value customer products and services.

Updating ontologies and statistical methods using supervised and/or unsupervised learning models can comprise a) using inferred classifications to aggregate ICKG attributes for dimensionality reduction; b) using vector space and clustering algorithms to group similar customers into specific aggregate customer knowledge graphs (ACKGs) or nearest ACKG neighborhoods; c) using Bayesian networks and/or other machine learning algorithms to identify new and statistically significant relationships in the ACKGs; d) identifying certain newly discovered insights and relationships from the ACKGs that can be best represented using RDF/OWL in the CKG; and e) identifying certain newly discovered insights and relationships from the ACKGs that can be best processed and scored using statistical methods.

When performing statistical calculations, it is desirable to limit the number of variables that must be processed, thus reducing both computational and statistical overhead. Limiting the number of variables that must be processed helps to minimize a problem called the "curse of dimensionality." Semantic reasoning that results in classification of data based on a set of related attributes can help limit the number of data points used in statistical calculations. A new graph can be created that contains the inferred calculations without contributing attributes if it can be determined that the contributing attributes are not required for other unrelated calculations and queries. For example, for a celebration event that occurs on a Sunday, with flowers and rice, an inference can be made with a 90 percent confidence level that the event is a wedding. In this example, once there is a classification of a new type of event, a need to retain contributing data variables is reduced. In order to reduce the need to retain the contributing data variables, the ICKG is viewed as a closed world data set.

As used in this disclosure, an ACKG comprises meaningful interferences that can be obtained from large statistically significant samples of customers that may be clustered together by having attributes and data relationships that exist in close vector space proximity. When using vector space and clustering algorithms to group similar customers into specific ACKGs or nearest ACKG neighborhoods, relevant triples within the ICKG are translated to numeric features that can be viewed as coordinates in a n-dimensional space. This allows for geometric distance measures, such as Euclidean distance, to be applied. There is a plurality of different types of clustering algorithms than can be selected. Some cluster algorithms such as K-means work well when the number of clusters is known in advance. Other algorithms such as hierarchical clustering can be used when the number of clusters is unclear in advance. In some cases, it may also be necessary to further reduce the number of attributes compared in order to effectively calculate distance functions when there is still relatively high dimensionality. An appropriate clustering algorithm can be selected after a process of experimental trial and error.

Once a clustering algorithm is selected, a set of clusters is generated to which individual customers either directly belong (for example when the clustering algorithm is considered hard, e.g. K-mean), or that may show fractional or probabilistic membership in one or more cluster neighborhoods (for example, in soft or fuzzy clustering). The clusters can be termed ACKGs because the clusters represent individual customer's membership in a group or aggregate. The clusters can then be tracked to identify various outcomes and relationships that are statistically significant only at the level of the group.

Bayesian networks are algorithms that can describe relationships or dependencies between certain variables. The algorithms calculate a conditional probability that an outcome is highly likely given specific evidence. As new evidence and outcome dispositions are fed into the algorithm, more accurate conditional probabilities are calculated that either prove or disprove a particular hypothesis. A Bayesian network essentially learns over time. There are other machine learning algorithms that can be selected depending upon the nuances of the problem space. These will range from linear regression to logistic regression, support vector machines, and neural networks.

Bayesian networks can be used to identify significant differences in outcomes across ACKGs. For example, the question of what factors may cause negative sentiment towards an organization can be asked across different clusters of customers to determine whether the factors differ depending on group membership. The Bayesian network can also be used to determine which interventions may have statistical significance to reverse negative sentiment for a particular ACKG, as the remediation efforts may be specialized for different groups of customers In certain cases insights and discoveries can be expressed in the CKG when there are extremely high confidence levels that specific customer attributes are associated with newly identified classifications that can also be formally described using RDF/OWL. This has the dual advantage of using OWL to describe the logic for both human facing and machine facing benefits as well as the advantage of using semantic reasoning to be used to infer the desired classifications.

In cases where the model is extremely complex and fuzzy, it may not be feasible to describe the logic using OWL. In this case, the statistical model can be executed using conventional techniques. There are several options that can be explored. There is an interface between R and triple stores (the SPARQL package) that allows machine learning algorithms to be invoked within an R engine using triples. Another option is to make use of the Predictive Model Markup Language (PMML). This allows machine learning and other statistical models to be invoked from a Java program that can access a triple store using the Jena library.

Applying logic and statistical models to customer knowledge graphs to generate recommendations can comprise: a) processing data in an ICG using an appropriate statistical scoring model; b) applying knowledge represented in a CKG to guide processing of individual customer interactions with recommendations; c) identifying an individual customer response to a recommendation interaction that was executed; and d) applying dispositions and evidence from a customer interaction to further train and improve models.

Statistical tools can be utilized that can interface with ICKGs in a triple store to invoke a desired set of statistical scoring models. The statistical scoring models output classifications and recommendations which are inserted as triples to an ICKG The insertion can be performed either as a response to an event, or as a batch function.

Semantic reasoning can be performed using the triples contained within the ICKG and the semantic rules defined in the CKG The semantic reasoning creates inferences for recommendations regarding the customer. This can be performed either as a response to an event, or as a batch function.

A customer's response to a recommended intervention can be captured by either automated means or by capturing a customer's verbal communication. Any dispositions captured may be inputted to learning algorithms.

Figure 6:
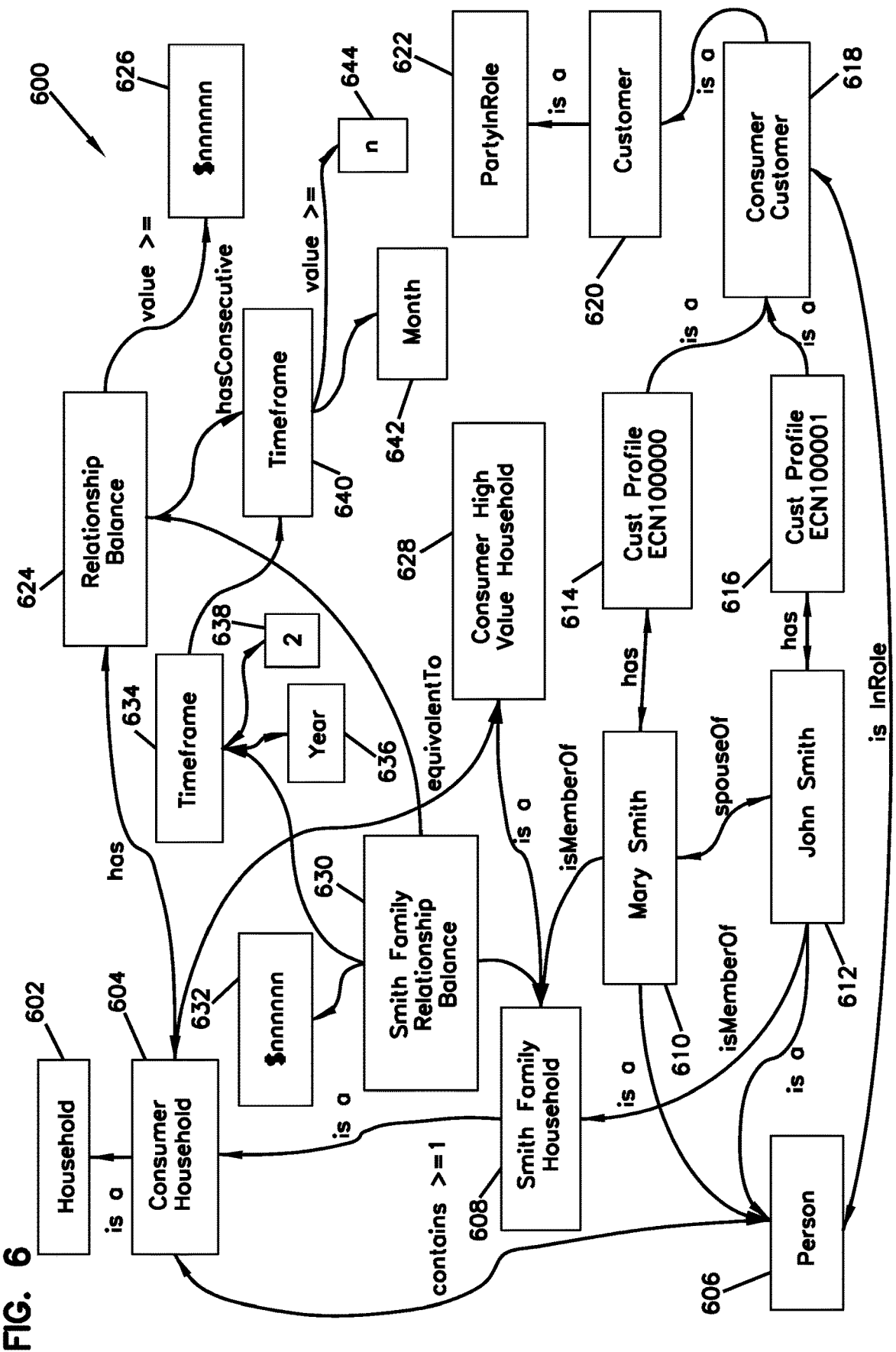
FIG. 6 shows an example knowledge graph.

FIG. 6 shows an example knowledge graph 600. The knowledge graph 600 shows accumulated knowledge for an example household 602, including relationships between members and other objects for the household. The household 602 is a consumer household 604 that contains one or more persons 606.

The consumer household 604 has a relationship balance 624 that is equal or greater than a dollar amount 626. For example, the consumer household 604 can have a relationship balance 624 of $25,000. In addition, the consumer household 604 has maintained the relationship balance for a timeframe 640 of a number 644 of consecutive months 642. For example, the $25,000 balance may be retained for a timeframe 640 of three consecutive months. The systems and methods can contain rules such that when a determination is made that the consumer household 604 maintains a relationship balance 624 that is greater than equal to a specific dollar amount 626 for a timeframe 640 of a predetermined consecutive number of months 642, the consumer household 604 can be inferred to be a high value consumer household. In this example, when a consumer household 604 maintains a balance of $25,000 for three consecutive months, an inference is made that the consumer household 604 is a high value consumer household.

The consumer household 604 shown in FIG. 6 is the Smith family household 608. Mary Smith 610 is a member of the Smith family household 608 as John Smith 612. John Smith 612 is spouse of Mary Smith 610. Mary Smith as a customer profile number 614 of ECN10000 and John Smith 612 has a customer profile number 616 of ECN100001. Both Mary Smith 610 and John Smith 612 are consumer customers 618. Consumer customers 618 are members of a group of customer 620 which is a member of a group PartyInRole 622.

As shown in FIG. 6, the Smith family household 608 is a consumer high value household 628. For example, the Smith family household can have a Smith family relationship balance of $100,000 for a timeframe 634 of two years, as designated by year 636 and number of years 638. Therefore, according to the rules for determining a high value consumer household, explained above herein, for this example an inference can be made that the Smith family household is a high value consumer household. The consumer high value household 628 is part of the group consumer household 604.

Figure 7:
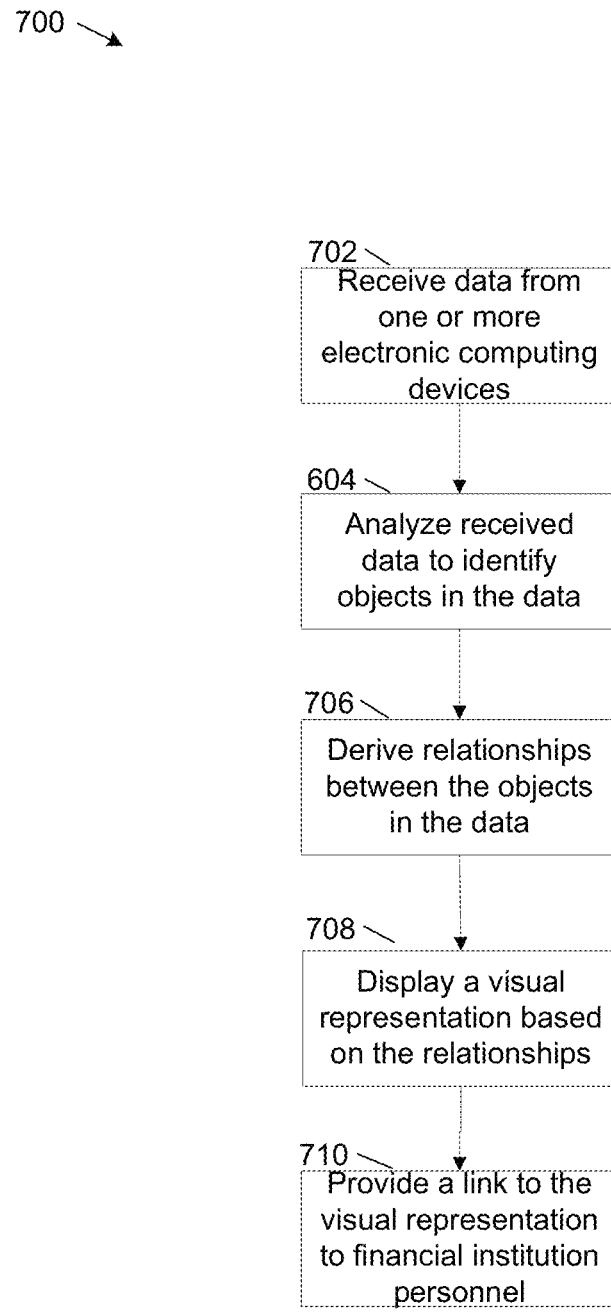
FIG. 7 shows a flowchart for an example method for providing a visualization of customer relationships to financial institution personnel.

FIG. 7 shows a flowchart of an example method 700 for providing a visualization of customer relationships to financial institution personnel.

At operation 702, customer data is received from one or more electronic computing devices. The customer data relates to a customer interaction with the financial institution and may include one or more aspects of the customer interaction. Example customer data can include records of financial institution transactions for the customer such as deposits and withdrawals, applications for loans and mortgages, payment history, bill pay history, emails from the customer or related to the customer, electronic notes based on a conversation between the customer and an employee of the financial institution, electronic conversions of telephone conversations between the customer and a representative at the financial institution, records of customer interaction on a financial institution website, etc. Other customer interactions are possible. The customer data may include a plurality of customer interactions. In some implementations, there may be hundreds or thousands of customer interactions included.

The customer data is in the form of textual data. Examples of textual data include a comma separated value (CSV) file, a text file, a text document such as a Microsoft Word file, a spreadsheet and other similar types of textual data.

The electronic computing devices can include desktop computers, laptop computers, tablet computers, smartphones, server computers and computing devices than can translate telephone recordings and handwritten notes into electronic form. The electronic computing devices can be located in different geographical areas and connected together via one or more networks, including the Internet.

The customer data is received at a financial services server computer, for example at financial institution server computer 108. In larger implementations, there may be one or more local financial services server computers that transmit the customer data to a central financial services server computer such as financial institution server computer 108.

At operation 704, the received customer data is analyzed to identify objects in the customer data. A natural language processor can parse customer textual data to identify the objects. Some examples of objects can include customers, employees, family members of customers, physical objects such as cars, houses, consumer items, loans, mortgages, vacations, in general any entity that can grammatically be expressed as a noun. The natural language processor also identifies other grammatical elements in the customer textual data including adjectives, verbs, prepositional phrases and other grammatical elements.

At operation 706, relationships are derived between objects in the customer data. The relationships can be derived based on customer interactions with the objects and customer behavior regarding the objects over time. An initial set of relationships can be dynamically modified by a user to correct any incorrect aspects in the initial set of relationships.

At operation 708, a visual representation is displayed based on the relationships. For the example method 700, the visual representation is a two-dimensional representation showing interconnections between two or more of the identified objects. In some implementations, the two-dimensional representations can take the form of a visual graph where objects and connections between objects can be represented as nodes and edges. In some implementations there can be a plurality of visual representations.

At operation 710, a link is provided to the visual representation to financial institution personnel. The link makes it possible for a financial institution employee to access the visual representation when the financial institution employee is dealing with the customer, for example in person, on the telephone, on an Internet chat or when the financial institution employee is reviewing a profile for the customer. By accessing the link, the financial institution employee can view the visual representation or the plurality of representations and become more familiar with the customer. As a result of viewing the one or more visual representations, the financial institution employee can recommend financial services for the customer or provide a better job of answering any questions the customer may have.

Figure 8:
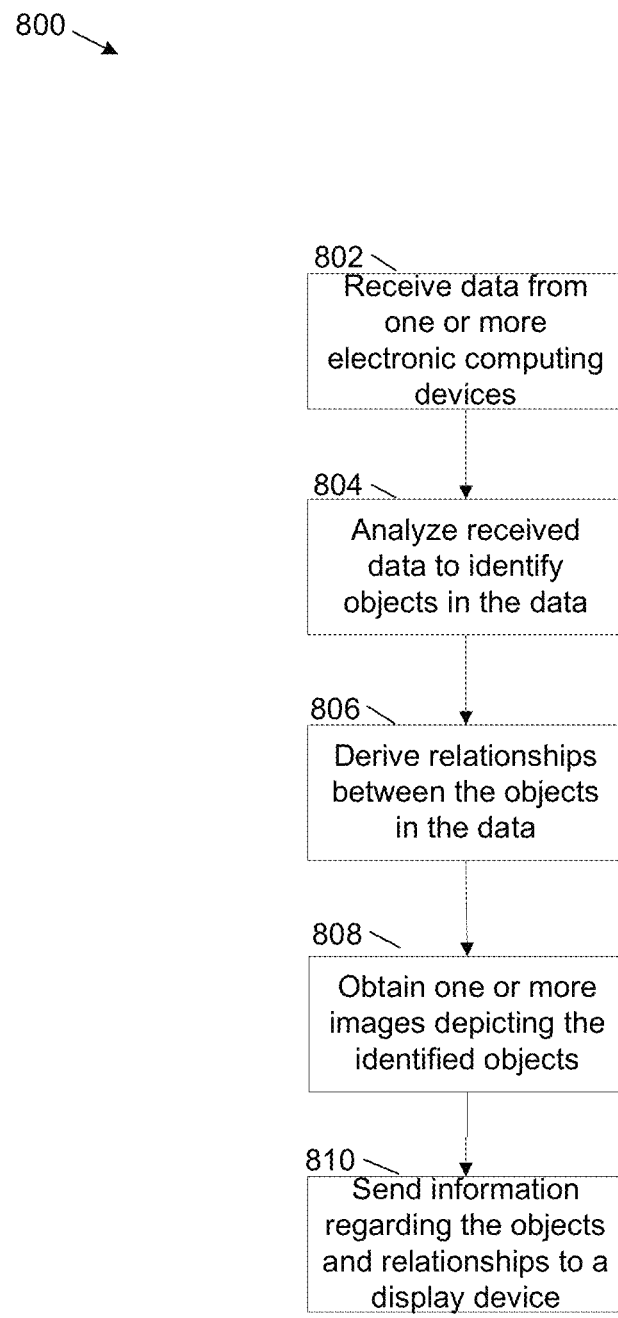
FIG. 8 shows a flowchart for another example method for providing a visualization of customer relationships.

FIG. 8 shows a flowchart of another example method 800 for providing a visualization of customer relationships. Method 800 provides for automatically obtaining images for derived objects and relationships obtained from customer data. In this regard, operations 802, 804 and 806 of method 800 are similar to operations 702, 704 and 706, respectively of method 700 of FIG. 7.

At operation 802, customer data is received from one or more computing devices. At operation 804, the customer data is analyzed to identify objects in the customer data. At operation 806, relationships are derived between objects in the customer data.

At operation 808, one or more images depicting the identified objects are automatically obtained. The images are obtained from the Internet, typically via a cloud crawl, as explained earlier herein.

At operation 810, the obtained images regarding the images and information regarding relationships between the objects are sent to a three-dimensional display device. The three-dimension display device can use the images and relationships to display the images and relationships in a three dimensional format. With some three-dimensional display devices, for example Oculus Rift, the user may be able to modify the displayed objects and relationships via virtually touching, moving and viewing the displayed objects and relationships.

In some implementations, a three-dimensional display device can have access to its own graphic library and images. In these implementations, the three-dimensional display device can access an image API, described earlier herein, for the customer activity processing engine 110. By accessing the customer API, the three-dimensional display device can obtain information regarding derived objects, attributes and relationships in the customer data. The three-dimensional display device can use information regarding the derived objects, attributes and relationships to obtain the images from the graphic library and display the images and relationships between the images on the three-dimensional display device.

Figure 9:
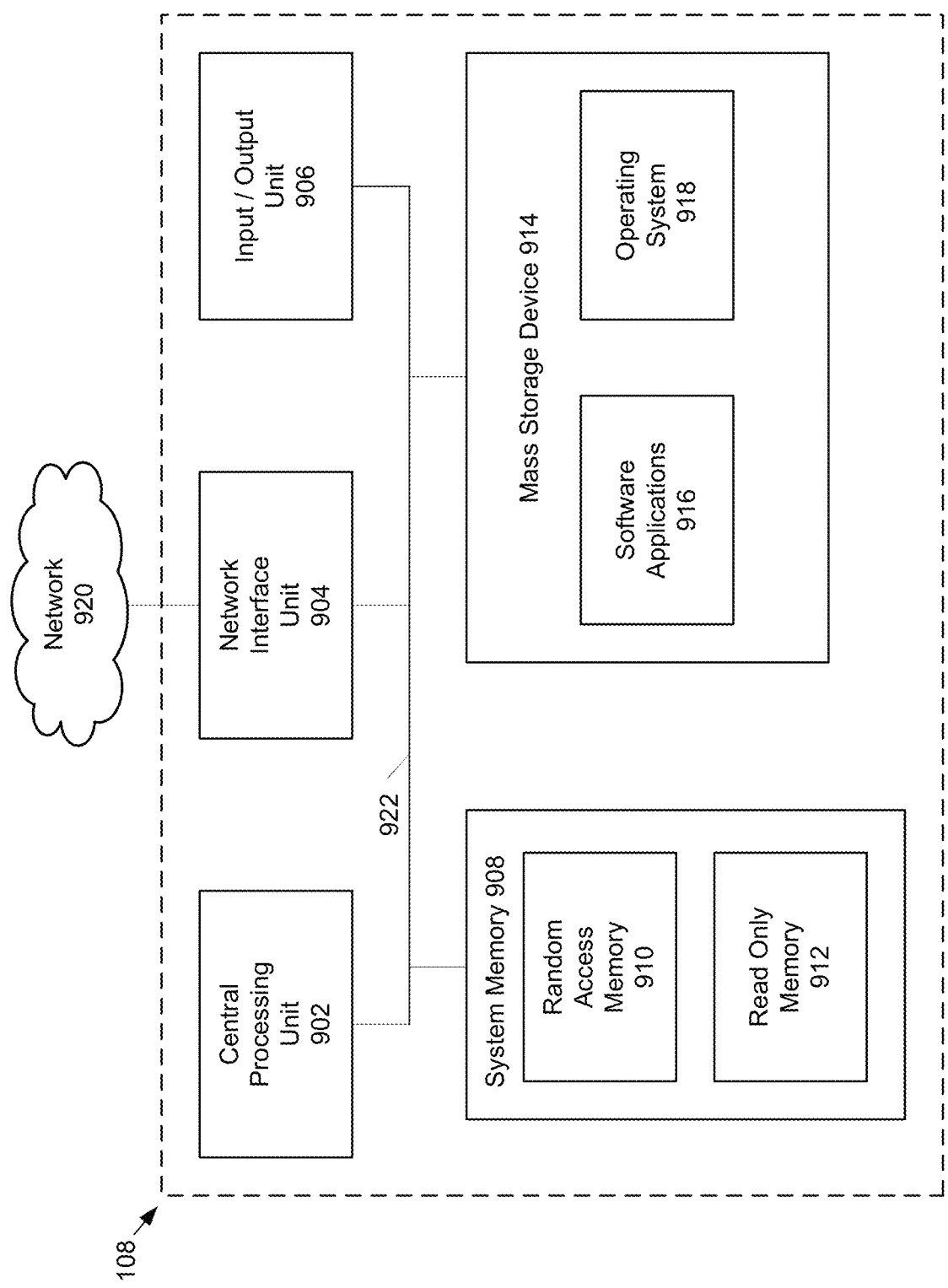
FIG. 9 shows example physical components of the financial institution server computer of FIG. 1.

As illustrated in the example of FIG. 9, financial institution server computer 108 includes at least one central processing unit ("CPU") 902, a system memory 908, and a system bus 922 that couples the system memory 908 to the CPU 902. The system memory 908 includes a random access memory ("RAM") 910 and a read-only memory ("ROM") 912. A basic input/output system that contains the basic routines that help to transfer information between elements within the financial institution server computer 108, such as during startup, is stored in the ROM 912. The financial institution server computer 108 further includes a mass storage device 914. The mass storage device 914 is able to store software instructions and data. A central processing unit, system memory and mass storage device similar to that in FIG. 9 are also included in financial institution server computer 108.

The mass storage device 914 is connected to the CPU 902 through a mass storage controller (not shown) connected to the system bus 922. The mass storage device 914 and its associated computer-readable data storage media provide non-volatile, non-transitory storage for the financial institution server computer 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the financial institution server computer 108.

According to various embodiments of the invention, the financial institution server computer 108 may operate in a networked environment using logical connections to remote network devices through the network 920, such as a wireless network, the Internet, or another type of network. The financial institution server computer 108 may connect to the network 920 through a network interface unit 904 connected to the system bus 922. It should be appreciated that the network interface unit 904 may also be utilized to connect to other types of networks and remote computing systems. The financial institution server computer 108 also includes an input/output controller 906 for receiving and processing input from a number of other devices, including a touch user interface display screen, or another type of input device.

Similarly, the input/output controller 906 may provide output to a touch user interface display screen or other type of output device.

As mentioned briefly above, the mass storage device 914 and the RAM 910 of the financial institution server computer 108 can store software instructions and data. The software instructions include an operating system 918 suitable for controlling the operation of the financial institution server computer 108. The mass storage device 914 and/or the RAM 910 also store software instructions, that when executed by the CPU 902, cause the financial institution server computer 108 to provide the functionality of the financial institution server computer 108 discussed in this document. For example, the mass storage device 914 and/or the RAM 910 can store software instructions that, when executed by the CPU 902, cause the financial institution server computer 108 to display received data on the display screen of the financial institution server computer 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. An electronic computing device comprising:
   a processing unit; and
   system memory, the system memory including instructions which, when executed by the processing unit, cause the electronic computing device to:
   receive data associated with one or more customers of an institution, the data being received from one or more other electronic computing devices associated with one or more external data sources that are external to the institution and external to the one or more customers;
   analyze the received data to identify objects in the data, one object identifying a family household and at least one other object identifying at least one person who is a member of the family household;
   determine, from the received data from the one or more external data sources, information about the family household;
   derive relationships between the objects in the data, based on customer interactions with the institution, including monetary relationships for the family household and a member relationship for each of the at least one person who is a member of the family household;
   obtain, from the Internet, one or more images depicting the objects;
   generate recommendations for the at least one person and an employee of the institution based on:
     (i) the received data from the one or more external data sources;
     (ii) the identified objects,
     (iii) the derived relationships between the objects;
     (iv) at least one prior response by the at least one person to a previously executed recommendation interaction between the at least one person and the institution; and
     (v) the information about the family household,
   the recommendations including a financial action for the at least one person to take for the family household and a suggestion for how the employee of the institution communicates with the at least one person based on the information about the family household;
   create a visual representation configured to be viewable by the employee of the institution, the visual representation being based on the relationships between the objects and the one or more images depicting the objects, the visual representation including the recommendations; and
   create a link to the visual representation, the link permitting access to the employee of the institution to view the visual representation.

2. The electronic computing device of claim 1, wherein the received data comprises data pertaining to one or more customer interactions with a financial institution.

3. The electronic computing device of claim 2, wherein the received data includes one or more of translations of telephone logs and banker's notes.

4. The electronic computing device of claim 2, wherein the received data includes one or more electronic documents and email messages.

5. The electronic computing device of claim 1, wherein analyze the received data to identify the objects in the data comprises determining grammatical elements in the received data.

6. The electronic computing device of claim 5, wherein the grammatical elements include one or more of nouns, adjectives and verbs.

7. The electronic computing device of claim 1, wherein derive relationships between the objects in the data comprises identifying an association between two or more of the objects.

8. The electronic computing device of claim 7, wherein derive relationships between the objects in the data further comprises associating one or more adjectives and verbs with one or more of the objects, the one or more adjectives and verbs being derived from grammatical elements in the received data.

9. The electronic computing device of claim 1, wherein the instructions further cause the electronic computing device to provide an application programming interface (API) to the display device to permit the display device to obtain one or more of the objects in order to obtain an image of the one or more objects.

10. The electronic computing device of claim 9, wherein the instructions further cause the electronic computing device to cause the API to permit the display device to obtain one or more attributes regarding one or more of the objects.

11. The electronic computing device of claim 10, wherein the instructions further cause the electronic computing device to cause the API to permit the display device to obtain one or more relationships regarding one or more of the objects.

12. The electronic computing device of claim 1, wherein the instructions further cause the electronic computing device to provide a user interface by which one or more of the derived relationships can be manually modified.

13. An electronic computing device comprising:
    a processing unit; and
    system memory, the system memory including instructions which, when executed by the processing unit, cause the electronic computing device to:
    receive data associated with a customer of a financial institution, the data being received from one or more other electronic computing devices associated with one or more external data sources that are external to the financial institution and external to the customer;
    process the received data to classify information within the data;

analyze the received data to identify objects in the data, one object identifying a family household and at least one other object identifying at least one person who is a member of the family household;

determine, from the received data from the one or more external data sources, information about the family household;

derive relationships between the objects in the data, based on customer interactions with the financial institution, including monetary relationships for the family household and a member relationship for each of the at least one person who is a member of the family household, at least one relationship being between the customer and a member of the customer's family household, and at least one relationship indicating a household value classification for the customer's family, the household value classification indicating a level of wealth for the customer's family;

generate recommendations for the customer and the financial institution based on:
(i) the received data from the one or more external sources;
(ii) the identified objects;
(iii) the derived relationships between the objects;
(iv) at least one prior response by the customer to a previously executed recommendation interaction between the customer and the financial institution; and
(v) the information about the family household;

the recommendations including a financial action for the customer to take for the family household and a suggestion for how an employee of the financial institution communicates with the customer based on the information about the family household; and display a visual representation based on at least one of the relationships within the data on a three-dimensional display device that immerses a viewer in the visual representation, the viewer being an employee of the financial institution, the at least one of the relationships on which the visual representation is based being between the customer and the member of the customer's family household, the visual representation including the recommendations;

display a link to the visual representation, the link permitting access to the employee of the financial institution to view the visual representation.

14. The electronic computing device of claim 13, wherein the received data includes one or more of email messages, telephone logs, meeting notes and financial institution documents.

15. The electronic computing device of claim 13, further comprising to derive objects and relationships between the objects from the data.

16. The electronic computing device of claim 15, further comprising to derive grammatical elements including nouns, adjectives and verbs from the received data.

17. The electronic computing device of claim 15, further comprising to derive grammatical elements including subjects and predicates from the received data.

18. A computer-readable data storage memory comprising instructions that, when executed by a processing unit of an electronic computing device, cause the processing unit to:

receive data regarding customer interactions with a financial institution from one or more other electronic computing devices associated with one or more external data sources that are external to the financial institution and external to a customer of the financial institution, the data including one of more of electronic documents, emails, telephone logs and banker's notes;

analyze grammatical elements in the received data to identify objects in the data, the grammatical elements including one or more of nouns, adjectives and verbs, one object identifying a family household of the customer and at least one other object identifying at least one person who is a member of the family household;

determine, from the received data from the one or more external data sources, information about the family household;

derive relationships between the objects in the data, based on the customer interactions with the financial institution, the relationships including monetary relationships for the family household and a member relationship for each of the at least one person who is a member of the family household, by associating one or more of the nouns, adjectives and verbs with one or more of the objects in the data, including a household value classification for the family household and a member relationship for each of the at least one person who is a member of the family household, the household value classification indicating that a monetary balance for the family household is greater than a predetermined dollar amount for a predetermined consecutive number of months;

obtain, from the Internet, one or more images depicting the objects;

generate recommendations for the at least one person and an employee of the financial institution based on:
(i) the received data from the one or more external data sources;
(ii) the identified objects;
(iii) the derived relationships between the objects;
(iv) at least one prior response by the at least one person to a previously executed recommendation interaction between the at least one person and the financial institution; and
(v) the information about the family household, the recommendations including a financial action for the customer to take for the family household and a suggestion for how the employee of the financial institution communicates with the customer based on the information about the family household;

send information regarding the objects to a three-dimensional display device that immerses the employee of the financial institution in a three-dimensional visual representation of the relationships between the objects, the information including the one or more images depicting the objects, the relationships between the objects, and the recommendations; and provide a link of the three-dimensional visual representation, the link permitting access to the employee of the financial institution to view the three-dimensional visual representation for the one or more images depicting the objects, the relationships between the objects, and the recommendations.

* * * * *